Figure 1:
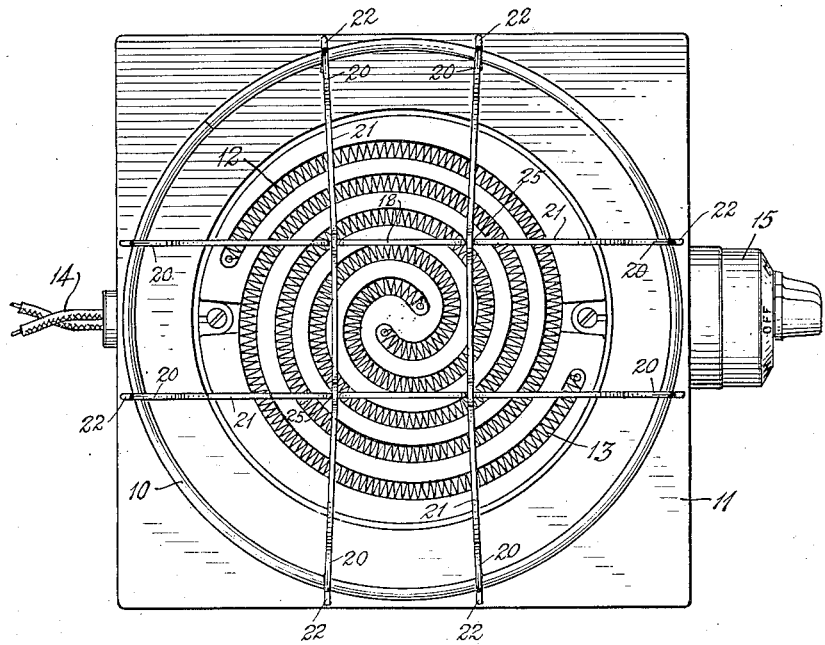

April 25, 1939. H. STRAUSE 2,155,623
TOASTER FOR ELECTRIC RANGES
Filed July 8, 1937 3 Sheets-Sheet 1

WITNESS
G. V. Rasmussen

INVENTOR
HARRY STRAUSE
BY
ATTORNEYS

April 25, 1939. H. STRAUSE 2,155,623
TOASTER FOR ELECTRIC RANGES
Filed July 8, 1937 3 Sheets-Sheet 2
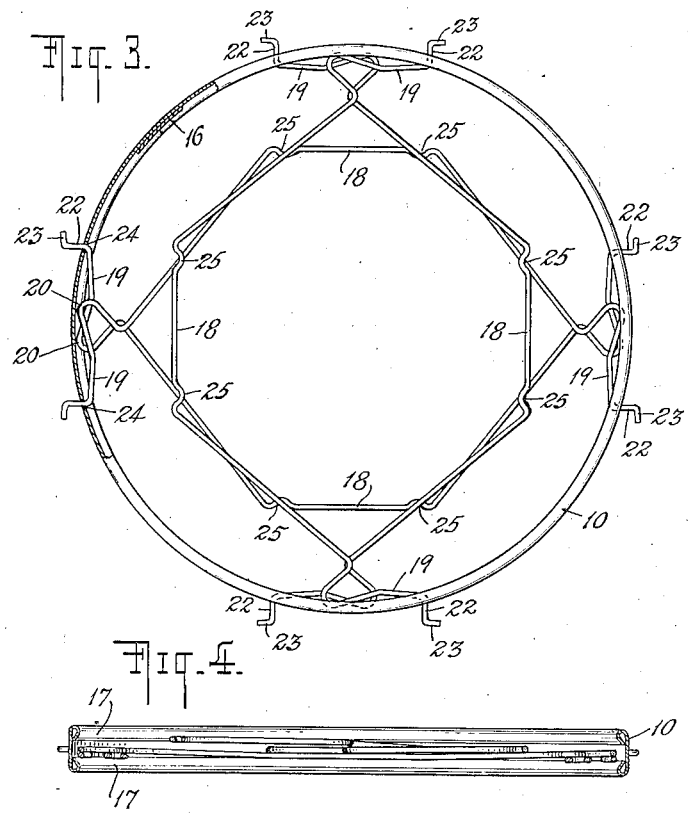
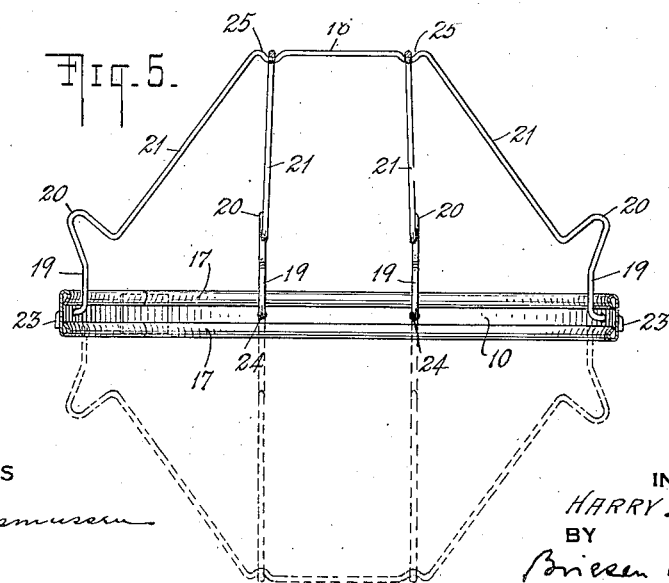

April 25, 1939.   H. STRAUSE   2,155,623
TOASTER FOR ELECTRIC RANGES
Filed July 8, 1937   3 Sheets-Sheet 3
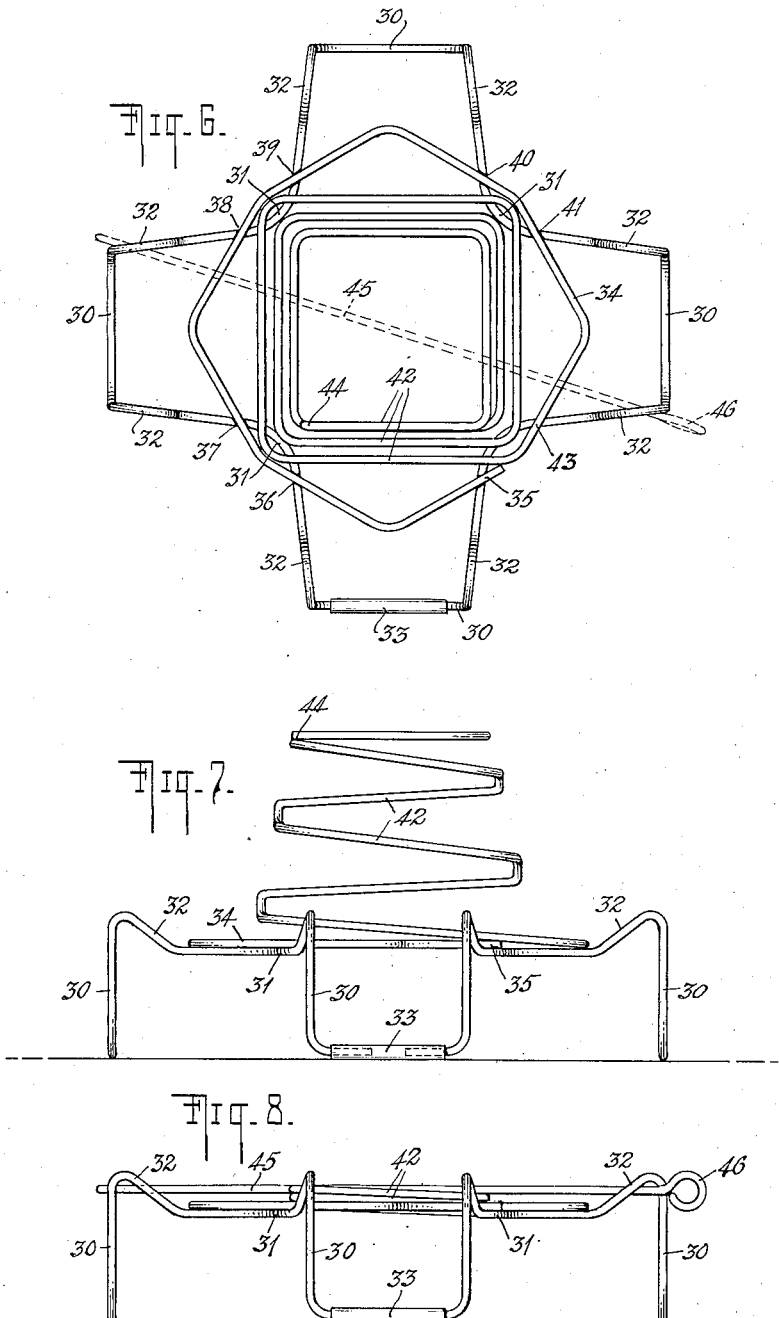
WITNESS
INVENTOR
HARRY STRAUSE
BY
ATTORNEYS Patented Apr. 25, 1939

2,155,623

UNITED STATES PATENT OFFICE 2,155,623

TOASTER FOR ELECTRIC RANGE

Harry Strause, Philadelphia, Pa.

Application July 8, 1937, Serial No. 152,476

12 Claims. (Cl. 53—5)

This invention relates to an implement adapted to be used in connection with the conversion of slices of bread into toast by electric ranges or stoves, provided with horizontally arranged electrical resistance elements.

In connection with the production of toast, particularly in the home, there are certain factors which stand out as being especially desirable. In the first place, toast is usually made under conditions where its demand is urgent and the device or devices involved in producing the same should be capable of converting the slices of bread into toast as quickly as possible. Not only should the toasting procedure be effected in a relatively short period of time, but should be such as to transform the surfaces only of the bread into a uniformly rich brown crisp condition, leaving the inner part of the bread soft and not dried out. Furthermore, the device utilized should be of simple, sturdy construction, inexpensive to make and capable of being stored in a relatively small space when not in use.

With the above and other considerations in mind, I have devised a toasting implement which, broadly speaking, consists of a base member having a central opening greater in area than the area occupied by the resistance elements in the horizontally disposed heating unit of an electric stove and a bread supporting structure formed of wire supported on such base and disposed over the central opening over such base, such bread supporting structure being formed so as to support the slices of bread at an acute angle with respect to the horizontally disposed electrical heating unit and in spaced relation to such unit so as to provide for the free circulation of air. This implement, I have found, can be used in conjunction with an electric stove to make toast quickly and satisfactorily. The toast supporting wires do not get very hot or even so hot that they could not be handled and when the toasting process is completed, the appliance can be removed readily by hand. The invention is further characterized by the novel arrangement and construction of the several parts of the implement which enable it to be cheaply constructed and when not in use, to be collapsed to such an extent that it can readily be placed in a kitchen drawer or cabinet.

The various features of novelty which characterize my invention are pointed out with particularity in the claims annexed to and forming a part of this specification, but for a better understanding of the invention, its advantages and specific objects attained with its use, reference should be had to the accompanying drawings and descriptive matter in which I have illustrated and described preferred embodiments of my invention.

Figure 2:
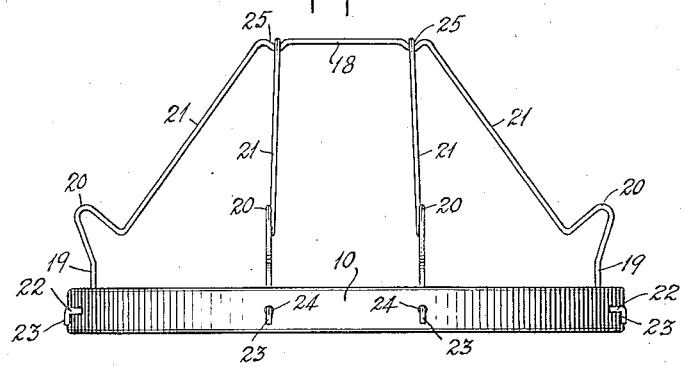

In the drawings, Fig. 1 is a plan view of one embodiment of my invention with the bread supporting wires assembled to receive slices of bread and showing the manner in which it should be placed upon an electric stove of usual construction; Fig. 2 is a side elevation of the appliance shown in Fig. 1; Fig. 3 is a plan view of the appliance in collapsed condition, the base member being illustrated partly in section to show details of construction; Fig. 4 is a cross-sectional view of Fig. 3; Fig. 5 is a cross-sectional view of Fig. 2, the dotted lines indicating the manner in which the bread supporting wires can be assembled on the opposite side of the base member; Fig. 6 is a plan view of another embodiment of my invention; Fig. 7 is a side elevation of the device shown in Fig. 6 and Fig. 8 is a view similar to Fig. 7 showing the appliance in collapsed condition.

Referring more particularly to Figs. 1 to 5 of the drawings in which similar reference characters identify similar parts in the several views, the numeral 10 designates the base of the toaster which, when the device is in use, rests upon the top plate of the electric stove. This is illustrated in Fig. 1 which shows an electric stove 11 of usual construction, having a heating unit comprising several (two in the embodiment shown) concentrically arranged resistance wires 12 and 13 which are connected to a source of current by the wires 14. The usual switch device 15 completes the electric stove.

The base 10 comprises a strip of thin sheet metal which has been bent into annular form and the opposing ends of which have been united by any suitable method, such as by welding them together in opposed relation in accordance with practices well known to the art or by positioning a short reenforcing strip 16 against the interior surfaces of such ends and uniting such strip 16 and the ends together, as is shown in Fig. 3 of the drawings. The base is preferably formed so that the central opening thereof is greater in area than the area occupied by the resistance elements in the heating unit of the stove, thereby enabling the base to be supported on the top plate of the stove out of range of the radiant heat from the glowing resistance elements and enabling the air to freely circulate above such elements unobstructed by any portion of the base. The side edges of the annular base 10 are turned inwardly to form the interior beads 17 which coact with the bread supporting wires or racks in a manner that will be hereinafter more fully explained. The width of the annular base should preferably be such that there is sufficient space in the area defined by the inturned edges of the beads 17 to accommodate the bread supporting wires in their collapsed condition, as shown in Fig. 4 of the drawings.

The bread supporting members or racks, of which there are four, are arranged in pairs, the racks of each pair being in spaced relation and arranged so that they are disposed transversely to the racks of the other pair when they are erected into position for the toasting operation. Each of the racks is constituted of wire and is formed to provide an intermediate or top reach and two end or side reaches, the top reach 18 of each rack being disposed in parallel relation with the top surface of the horizontally disposed heating unit and the side reaches of each rack, each comprising a short leg portion 19 arranged to stand substantially vertically when the rack is an erect position, a loop portion 20 forming a rest for the bread and an upper portion 21 connecting the loop portion 20 with the top reach 18 and forming a support against which the inner surface of the slice of bread rests, the upper portions 21 of each rack converging towards each other and being inclined at an angle of from 50 to 60° with respect to the horizontal so that slices of bread upon such racks will be disposed over the resistance elements of the heating unit and inclined at an acute angle to the horizontal planes in which such resistances lie. As the loop or offset portions 20 of the racks are spaced from the annular base 10, so that the slices of bread are supported in spaced relation to such base and the heating unit of the stove and as the top of the racks form an open outlet, there is provided sufficient space to permit of the free circulation of air above the resistance elements.

The racks are so arranged with relation to the base 10 that they may be collapsed within such base when the device is not in use and can be assembled on either side of such base for the toasting of bread. As shown more clearly in Fig. 3, each end of the racks consists of an outwardly projecting portion 22 connected to a leg portion 19 and an outer bent portion 23. The portions 22 of the racks extend through a similar number of apertures 24 provided in the side walls of the annular base 10 and arranged so that they all lie in the same horizontal plane and approximately midway of the width of the annular base 10, the two apertures 24 with which each rack is associated being positioned on such base so that a line connecting them is parallel to and slightly shorter than a diameter of such base. Because of this connection, the racks may be pivoted through an angle of more than 180° through the annular base 10 and are enabled to be erected into proper position on either side of the base, as shown in Fig. 5, or collapsed into superimposed relation within the base, as shown in Fig. 4, thereby permitting the appliance to be conveniently stored. As the racks are similar in form and the apertures 24 lie in the same horizontal plane, the racks in their assembled or erected condition will be placed under tension, thereby providing a rigid and strong bread supporting structure.

Each of the racks is formed so that the distance between the leg portions 19 thereof is greater than the distance between the two apertures 24 through which its end portions 22 extend, whereby the rack is normally under slight tension in the structure. When the rack is raised to upright position, the rolled rim or bead 17 on the side of the annular base from which the rack projects, will further contract the side reaches of the rack and place them under increased tension. As the two apertures with which such rack is associated, are positioned in spaced relation below such bead 17 and are on a chord of the annular base 10 which is parallel to and slightly smaller than a diameter of such base, the tension in the side reaches of the rack will cause the leg portions 19 thereof and the rolled rim 17 of the base to coact, when the rack is released from its erect position, to cause the rack to rotate automatically into its collapsed position within the annular base 10. The apertures 24 are slightly greater in diameter than the projecting portions 22 of the rack so that there is no resistance offered to this camming action of the rolled rim 17 and the projecting portions 22 of the rack are made sufficiently long to enable the side reaches to move inwardly under the camming action of the rolled rim, the projecting portions 22 sliding in the apertures 24 during this operation.

The loop portion 20 of each rack cooperate with the roller rims 17 to lock the rack in its collapsed position within the annular base 10, thereby preventing such rack from pivoting beyond the outer confines of such base until it is ready for use. This feature of the invention is attained by forming the looped portions 20 of each rack so that the distance between the outermost parts thereof is approximately the same as the diameter of the interior wall of the annular base 10 and greater than the interior diameters of the rolled rims or beads 17. Thus, when the rack is forced within the interior of the base 10, the outer parts of the loop portions 20 thereof will ride over a rolled rim 17, causing the side reaches of the rack to be contracted until the loop portions 20 have moved inwardly past the rim 17, whereupon the tension created in the side reaches by such contraction will cause the latter to spring outwardly bringing the loop portions 20 to their normal outermost position within the annular base 10. In this position of the rack, the loop portions 20 will prevent the rack from swinging outwardly beyond the rims 17 until it is positively pivoted from its collapsed condition by the user. The sliding connection between the rack and the annular base 10 permits the side reaches of the rack to move inwardly during the passing of the loop portions 20 over a rim 17 without twisting.

The top reaches 18 of the racks are each provided with a pair of notches or depressions 25 adapted when the racks are in their erect positions to seat in cooperating relation with similarly formed notches or depressions 25 in the top reaches of the other racks so as to prevent accidental collapsing of the rack structure while the toaster is in use, the spring of the top reaches and the side reaches being relied upon to insure the desired interlocking and disengaging of said top reaches in raising or lowering the racks.

It will be apparent from the above that the present invention provides an appliance which can be satisfactorily used in conjunction with an electric stove or range to produce toast and which satisfies all of the requirements of a practical toasting device. When the racks are raised and interlocked by means of the depressions or notches 25 and the appliance properly positioned over the heating unit of an electric stove, the slices of bread placed thereon will be supported at an acute angle of approximately 60° to the horizontally disposed glowing resistance wires of the heating unit and in spaced relation therewith. The convection currents of air heated by the glowing elements of the stove rise from such elements until they impinge against the slices of bread and then flow along the exposed surfaces of such slices to their upper extremities. The heat carried by the convection currents is thereby transferred substantially uniformly throughout the outer surfaces of the slices of bread to effect a speedy and uniform toasting of the bread, transforming the exposed surfaces of such slices into a uniformly rich brown crisp condition. At the end of the toasting operation, the appliance can be removed readily by hand and the toast supporting wires collapsed within the annular base 10, in which condition the toaster can be conveniently stored in the ordinary kitchen drawer or cabinet or hung on a nail in a closet, the flat annular form of the collapsed appliance occupying little room in its place of storage and the rims 17 and loop portions 20 preventing accidental opening of the racks until the appliance is ready for use.

From the above, it will be seen that the invention provides an appliance which is particularly well adapted for the purposes for which it was devised and it will also be evident that the above described device is susceptible of considerable change without material departure from the principles and spirit of the invention. For example, in Figs. 6 to 8 of the drawings, I have shown an embodiment which differs in form from the above described construction, but which embodies the same essential features. In this embodiment of the invention, the supporting base comprises a metal wire which has been formed to provide the vertically disposed U-shaped legs 30 by means of which the appliance is mounted upon the electric stove and the inwardly curved supports 31, the latter of which are disposed horizontally at substantially the same level but below the top portions of the U-shaped legs 30, so that the portions 32 connecting such supports 31 with the legs 30 are inclined downwardly towards the supports 31. The ends of the metal wire forming such base may be welded together in any suitable fashion or connected by a coupler, such as the sleeve member 33 illustrated in the drawings.

Mounted upon the inwardly curved supports 31 is the bread supporting rack which in the embodiment illustrated consists of a metal wire which has been bent to form a spiral spring, the bottom coil of which is octagonally-shaped and the upper coils of which are shaped in the form of squares of successively reduced areas to produce a substantially pyramidal effect. The octagonally-shaped bottom coil 34 of the rack is secured at the points 35, 36, 37, 38, 39, 40 and 41 to the inwardly curved supports 31 by solder or welding, the end of such bottom coil connecting with the adjacent square coil 42 of the spring not being secured to a support 31 and extending over a curved support 31 at the point 43 in spaced relation thereto. The upper end of the coiled spring is united in any suitable manner to the top coil at the point 44, forming a closed upper square.

With the coiled spring in raised position, as shown in Fig. 7 of the drawings, slices of bread may be laid upon the inclined portions 32 of the inwardly curved support 31 and against the coiled spring, whereby they will be supported at an acute angle to the horizontal planes in which lie the glowing elements of the horizontally disposed heating unit of the electric stove. When the toasting operation has been completed, the top coil of the spring may be pushed down, the square coils of the spring collapsing within each other and all of the square coils collapsing within the bottom octagonally-shaped coil 34 of the spring. A stiff wire rod 45 is provided to maintain the coiled spring in collapsed condition when the appliance is not in use, such rod interengaging at its ends with two diagonally opposed portions of the supporting base and spanning the coiled spring as shown in Fig. 8. The rod 45 may be provided with a looped end 46 to facilitate the disengagement of such rod when the appliance is to be used.

From the foregoing description it will be evident that in both of the disclosed embodiments of the invention the bases thereof have vertically extending portions, which are adapted to rest in contact with a supporting surface such as a table or a wall in either of the two reversible collapsed positions of the appliance and have a vertical dimension at least as great as the vertical dimension of the collapsible bread-supporting members when in collapsed condition, so that the latter will be contained entirely within the base when in such condition. Both bases also have an unobstructed opening through which, when the appliance is positioned on an electric stove, heat from the horizontally arranged electrical heating elements of the stove will reach the slices of bread directly without passing through and thereby heating any part of the bases. The bread-supporting members associated with the base of each embodiment include a bent portion, the bent-over part of which supplies a support for the lower edge of the bread slices and brace members for the bread slices to rest against, such members being also positionable to extend over the opening of the base member at acute angles with relation to the area of the heating unit and being collapsible to positions within the confines of the vertical portions of their associated bases. Furthermore both embodiments include means which coact with the bend of the bent portions of the bread supports for holding the brace members in their collapsed condition within the confines of the base against unintentional protrusion when the toasting appliance is not in use so that the toaster in its collapsed condition will lie flat upon or against a supporting surface in either of the two reversible positions of the collapsed device.

I claim:

1. A toaster appliance for use in conjunction with an electric stove having a heating unit composed of horizontally arranged electrical resistance elements, comprising a base having an unobstructed opening greater in area than the area occupied by the resistance elements in the heating unit of the stove, a bread support formed of wire mounted on said base, said bread support being positioned over the opening of said base member and being formed so that slices of bread supported thereby will be disposed over the resistance elements of the electrical heating unit at an acute angle to the horizontal planes in which such elements lie and being arranged relative to said base to provide space for free circulation of air between the bottoms of the slices of bread and the horizontally disposed heating unit.

2. A toaster appliance for use in conjunction with an electric stove having a heating unit composed of horizontally arranged electrical resistance elements, comprising a base having an unobstructed central opening greater in area than the area occupied by the resistance elements in the heating unit of the stove, a bread support formed of wire attached to said base, said bread support being positioned over the opening of said base member and being formed so that slices of bread supported thereby will be disposed over the resistance elements of the electrical heating unit at an acute angle to the horizontal planes in which such elements lie and being arranged relative to said base to provide space for free circulation of air between the bottoms of the slices of bread and the horizontally disposed heating unit, the wire sections of said bread support being constructed and arranged to be collapsed within said base when the appliance is not in use and said base having a vertical dimension at least as great as the vertical dimension of said bread support when in collapsed condition, whereby said bread support will be contained entirely within said base when in such condition.

3. A toaster appliance for use in conjunction with an electric stove having a heating unit composed of horizontally arranged electrical resistance elements, comprising a base member having a central opening greater in area than the area occupied by the resistance elements in the heating unit of the stove, a plurality of racks formed of wire disposed about and projecting upwardly from said base member, said racks extending over the central opening of said base member in converging relation and at an acute angle with relation to the horizontal so that slices of bread upon said racks will be disposed over the resistance elements of the electrical heating unit and inclined at an acute angle to the horizontal planes in which such elements lie, each of said racks having an offset portion spaced from said base member, the said offset portions forming rests adapted to support slices of bread in spaced relation to said base member and the heating unit of the stove thereby providing for free circulation of air above the resistance elements.

4. A toaster appliance for use in conjunction with an electric stove having a heating unit composed of horizontally arranged electrical resistance elements, comprising a base member having side walls encompassing an open central portion, two pairs of racks mounted on said base member and adapted to support slices of bread, the racks of each pair being in spaced relation and arranged transversely to the racks of the other pair, each of said racks being constituted of a single piece of wire formed to provide a top reach and converging side reaches disposed at an acute angle to the horizontal planes in which the resistance elements lie and being pivotally connected at its ends to the side walls of said base member so that said racks can be collapsed within the space bounded by the side walls of said base member and can be assembled in operative position on either side of said base member, the vertical dimension of the side walls of said annular base member being at least as great as the vertical dimension of said racks when in collapsed condition, whereby said racks will be contained entirely within the confines of said side walls when in such condition.

5. A toaster appliance for use in conjunction with an electric stove having a heating unit composed of horizontally arranged electrical resistance elements, comprising a base member having inwardly extending portions along one edge thereof, a plurality of racks mounted on said base member, each of said racks being constituted of a single piece of wire formed to provide a top reach and converging side reaches disposed at an acute angle to the horizontal planes in which the resistance elements lie and being pivotally connected at its ends to the side walls of said base member so as to enable said racks to be collapsed within the space bounded by said base member, the side reaches of said racks having offset portions forming rests for the slices of bread to be toasted and being adapted to coact with said inwardly extending portions of said base member to lock the racks in collapsed position within said base member.

6. A toaster appliance for use in conjunction with an electric stove having a heating unit composed of horizontally arranged electrical resistance elements, comprising a base member having an interior bead along one edge thereof, a plurality of racks mounted on said base member, each of said racks being constituted of a single piece of wire formed to provide a top reach and converging side reaches disposed at an acute angle to the horizontal planes in which the resistance elements lie and being pivotally connected at its ends to the side walls of said base member so as to enable said racks to be collapsed within the space bounded by said base member, the side reaches of said racks having offset portions forming rests for the slices of bread to be toasted and being adapted to coact with the interior bead of said base member to lock the racks in collapsed position within said base member.

7. A toaster appliance for use in conjunction with an electric stove having a heating unit composed of horizontally arranged electrical resistance elements comprising a base member made of metal and having an inwardly turned rolled edge, a plurality of racks mounted on said base member, each of said racks being constituted of a single piece of wire formed to provide a top reach and converging side reaches disposed at an acute angle to the horizontal planes in which the resistance elements lie and being pivotally connected at its ends to the side walls of said base member so as to enable said racks to be collapsed within the space bounded by said base member, the side reaches of each of said racks having offset portions, the distance between the outer parts of said offset portions being greater than the interior diameter of said rolled edge and said offset portions being adapted to coact with the rolled edge of said base member to lock the racks in collapsed condition within said base member.

8. A toaster appliance for use in conjunction with an electric stove having a heating unit composed of horizontally arranged electrical resistance elements comprising a base member made of metal and having inwardly turned rolled edges, a plurality of racks mounted on said base member, each of said racks being constituted of a single piece of wire formed to provide a top reach and converging side reaches disposed at an acute angle to the horizontal planes in which the resistance elements lie and being pivotally connected at its ends to the side walls of said base member so as to enable said racks to pivot through an angle greater than 180° through said base member and to be collapsed within said base member, the said reaches of said racks being provided with offset portions formed so that the distance between their outer parts is greater than the distance between interior surfaces of said rolled edges and adapted to coact with said rolled edges to lock the racks in collapsed condition within said base member.

9. A toaster such as defined in claim 8, in which the pivoted ends of the racks are arranged with relation to base member to enable them to contract inwardly towards each other while the offset portions of the side reaches are being moved past a rolled edge.

10. A toaster appliance for use in conjunction with an electric stove having a heating unit composed of horizontally arranged electrical resistance elements, comprising a base having an unobstructed opening through which, when the appliance is positioned on the stove, convection currents heated by the resistance elements in the heating unit of the stove can freely circulate, a bread support mounted on said base and positioned over the opening of said base member, said bread support consisting of a spiral spring having polygonally-shaped coils of decreasing areas adapted to support slices of bread over the resistance elements at an acute angle to the horizontal planes in which such elements lie and to be collapsed one within the other when the device is not in use.

11. A toaster appliance for use in conjunction with an electric stove having a heating unit composed of horizontally arranged electrical resistance elements comprising a base having an unobstructed opening through which, when the appliance is positioned on the stove, convection currents heated by the resistance elements in the heating unit of the stove can freely circulate, a bread support mounted on said base and positioned over the opening of said base member, said bread support comprising a spiral spring having polygonally-shaped coils of decreasing areas adapted to be collapsed one within the other when the device is not in use and a fastening device adapted to coact with said base to maintain said spring in collapsed condition until ready for use.

12. A toaster appliance for use in connection with an electric stove having a heating unit composed of horizontally arranged electric resistance elements, comprising an appliance-supporting base section having vertically extending portions adapted to rest in contact with a supporting surface in each of two reversible positions of the appliance and having an unobstructed opening through which, when the appliance is positioned on the stove, heat from the source of heat will reach the bread directly without passing through and thereby heating any part of the base, bread-supporting members associated with said base including a bent portion, the bent-over part of which supplies a support for the lower edge of the bread slice, and brace members for the bread slices to rest against said brace members being positionable to extend over the opening of the base member at acute angles with relation to the area of the heating unit and being collapsible to positions within the confines of the vertical portions of the base, and means co-acting with the bend of the bent portions of the bread supports for holding the brace members in their collapsed condition within said confines of the base against unintentional protrusion when the toaster is not in use, whereby the toaster in its collapsed condition will lie flat upon or against a supporting surface in either of the two reversible positions of the collapsed device.

HARRY STRAUSE.